US009528694B2

(12) United States Patent
Lin (10) Patent No.: US 9,528,694 B2
(45) Date of Patent: Dec. 27, 2016

(54) PLANT-GROWING LAMP CAPABLE OF EFFECTING CHANGE IN LOCAL ENVIRONMENT

(71) Applicant: Mou-Li Lin, Tainan (TW)

(72) Inventor: Mou-Li Lin, Tainan (TW)

(*) Notice: Subject to any disclaimer, the term of this patent is extended or adjusted under 35 U.S.C. 154(b) by 144 days.

(21) Appl. No.: 14/658,501

(22) Filed: Mar. 16, 2015

(65) Prior Publication Data

US 2016/0273755 A1    Sep. 22, 2016

(51) Int. Cl.
| | |
|---|---|
| *A01G 9/02* | (2006.01) |
| *F21V 33/00* | (2006.01) |
| *F21V 23/04* | (2006.01) |
| *F21V 1/00* | (2006.01) |
| *A01G 7/04* | (2006.01) |
| *A01G 27/00* | (2006.01) |
| *A01G 15/00* | (2006.01) |
| *F21Y 101/02* | (2006.01) |
| *F21Y 113/00* | (2016.01) |

(52) U.S. Cl.
CPC ........... *F21V 33/0028* (2013.01); *A01G 7/045* (2013.01); *A01G 15/00* (2013.01); *A01G 27/003* (2013.01); *F21V 1/00* (2013.01); *F21V 23/0471* (2013.01); *F21V 33/0056* (2013.01); *F21Y 2101/02* (2013.01); *F21Y 2113/005* (2013.01)

(58) Field of Classification Search
CPC ........... A01G 7/045; A01G 9/02; A01G 31/02
USPC .................................................... 47/66.6, 79
See application file for complete search history.

(56) References Cited

U.S. PATENT DOCUMENTS

| | | | | |
|---|---|---|---|---|
| 6,652,132 B1* | 11/2003 | Hsueh | ................... | H04R 1/028 362/122 |
| 2003/0204990 A1* | 11/2003 | Hsueh | ................... | H04R 1/028 47/66.6 |
| 2008/0092440 A1* | 4/2008 | Johnson | ............. | A01G 13/0212 47/48.5 |
| 2008/0222949 A1* | 9/2008 | Bissonnette | ........... | A01G 7/045 47/60 |
| 2009/0151248 A1* | 6/2009 | Bissonnette | ........... | A01G 31/02 47/59 S |
| 2010/0031566 A1* | 2/2010 | Azoulay | ................ | A01G 9/247 47/61 |
| 2014/0223818 A1* | 8/2014 | Coghlan | ................ | A01G 31/02 47/62 R |
| 2014/0223819 A1* | 8/2014 | Coghlan | .............. | A01K 63/045 47/62 R |

(Continued)

*Primary Examiner* — Kristen C Hayes
(74) *Attorney, Agent, or Firm* — Rosenberg, Klein & Lee (57) ABSTRACT

A plant-growing lamp capable of effecting a change in local environment includes a container, a lampshade with a fixing space, a lighting unit, a water supply unit, a power supply unit, and a sensor. The container is provided with a receiving space, a water storage space, and a loudspeaker. The lighting unit is provided with a circuit board, which has two sides respectively provided with first and second light-emitting elements and can drive the first and second light-emitting elements to emit light of different colors and of different wavelengths respectively. The water supply unit includes a pipe with a water outlet end facing the receiving space. The power supply unit supplies electricity to the loudspeaker, the lighting unit, the water supply unit, and the sensor. The sensor triggers the loudspeaker, the lighting unit, and the water supply unit to generate a simulated weather condition when sensing an approaching person.

10 Claims, 6 Drawing Sheets

(56) References Cited

U.S. PATENT DOCUMENTS

2015/0305259 A1* 10/2015 Galassi .................. A01G 9/16
47/62 R

* cited by examiner

PLANT-GROWING LAMP CAPABLE OF EFFECTING CHANGE IN LOCAL ENVIRONMENT

BACKGROUND OF THE INVENTION

1. Technical Field

The present invention relates to a plant-growing lamp structure which, when approached by a person, is automatically triggered to create a simulated weather condition and thereby effect a change in local environment so as to add fun to the cultivation of plants.

2. Description of Related Art

Plant cultivation, which used to be an outdoor activity, is now carried out primarily indoors, and in order to simulate sunshine, plant lights have been designed to provide irradiation which enables or promotes the growth of plants.

A typical plant light structure is disclosed in Taiwan Utility Model Patent No. M484300, which is titled "PLANT-GROWING LAMP OF ADJUSTABLE LIGHT QUALITY" and was issued on Aug. 21, 2014. According to the disclosure of this patent, a main body is provided with at least one plant light source with a blue tint and at least one plant light source with a red tint. When supplied with electricity, each plant light source with a blue tint generates white light with a continuous spectrum shifted toward blue light and suitable for plant growth, and each plant light source with a red tint generates white light with a continuous spectrum shifted toward red light and also suitable for plant growth. The light quality of this plant-growing lamp can be adjusted according to the growing conditions of a plant in each stage of growth to meet the light quality requirements of each stage.

By converting between different ranges of wavelengths, the plant-growing lamp of the '300 patent can generate light suitable for irradiating plants in different growth stages or of different species. The conversion of wavelengths, however, is the only function of this plant-growing lamp. Given the current trend in plant cultivation, which is toward more refined practice and toward operability in a limited space by a single individual, especially the cultivation of decorative plants at home or in the office, it is preferable that cultivation management is made simple and can dispense with intensive labor. Autonomous management is even better.

The foregoing trend gave rise to Taiwan Utility Model Patent No. M486002, which is titled "LANDSCAPE LIGHT" and was issued on Sep. 11, 2014. According to the disclosure of the '002 patent, the landscape light includes an upper cover, a bottom portion, a light-permeable cover, and a cultivation base. The light-permeable cover has a hollow cylindrical structure whose two end surfaces are located in the upper cover and the bottom portion respectively such that a receiving space is formed between the upper cover, the light-permeable cover, and the bottom portion. The cultivation base is provided at the bottom portion and within the receiving space. In addition, a light-emitting module is provided in the receiving space to illuminate the receiving space, thus not only shedding light on the cultivation base in the receiving space, but also producing a luminous visual effect. The landscape light further includes a water supplier fixedly provided at the upper cover. The water supplier includes a water container and a sprinkler. The water container is provided outside the upper cover while the sprinkler is provided inside the upper cover and fixed to the water container.

Although the landscape light of the '002 patent features autonomous management (i.e., automatic lighting and water sprinkling for the plant being cultivated) and can be placed at home or in the office for decorative purposes, it can also be dull or even boring due to its incapability to effect a variety of changes in local environment, which leaves room for improvement.

BRIEF SUMMARY OF THE INVENTION

In consideration of the aforementioned drawbacks of the existing plant light structures for decorative or landscaping purposes, the present invention provides a plant-growing lamp capable of effecting a change in local environment. The plant-growing lamp includes a container, a lampshade, a lighting unit, a water supply unit, a sensor, and a power supply unit. The container is provided with a partition plate for dividing the interior space of the container into a receiving space and a water storage space. The partition plate is provided with a plurality of drain holes which bring the receiving space into communication with the water storage space. Also, a loudspeaker is provided at a bottom portion of the container. The lampshade is provided above the container and is provided with a post fixed to the container. The lampshade allows passage of light and is provided with a fixing space. The lighting unit is provided in the fixing space and is provided with a circuit board. A top portion of the circuit board is provided with a plurality of first light-emitting elements while a bottom portion of the circuit board is provided with a plurality of second light-emitting elements. The circuit board can drive the first light-emitting elements to emit light of different colors and drive the second light-emitting elements to emit light of different wavelengths. The water supply unit is provided in the water storage space and is connected with a pipe. The pipe is provided with at least one water outlet end above the receiving space. The sensor is provided at the lampshade and is separately connected to the loudspeaker, the lighting unit, and the water supply unit in order to transmit signals to and from the loudspeaker, the lighting unit, and the water supply unit. When sensing an approaching person, the sensor triggers the loudspeaker to generate a thunderous sound effect, the lighting unit to change the light emitted by the first light-emitting elements and/or the second light-emitting elements in terms of color and wavelength, and the water supply unit to draw water. The power supply unit is provided in the fixing space and is separately electrically connected to the lighting unit, the water supply unit, the loudspeaker, and the sensor.

The container is provided with a water inlet hole adjacent to upper periphery of the water storage space, and a plug is provided in the water inlet hole.

The lampshade is shaped as a cloud.

The first light-emitting elements are light-emitting diodes (LEDs), and so are the second light-emitting elements.

The water supply unit is a water pump.

The at least one water outlet end includes a first water outlet end and a second water outlet end, wherein the first water outlet end is above the receiving space of the container.

The lampshade has a bottom portion provided with a circular ring-shaped water-collecting channel, and the lowest part of the water-collecting channel is provided with a plurality of water-leaking holes. The circuit board is fixed at the center of the water-collecting channel. The second water outlet end is provided with a plurality of water outlet holes above the water-collecting channel.

The water outlet holes are spaced from the circuit board.

The sensor conducts sensing by an infrared sensing technique, an ultrasound sensing technique, a photoelectric sensing technique, an RFID (radio frequency identification) sensing technique, an electromagnetic wave sensing technique, or a radar sensing technique.

The power supply unit is a dry battery, a rechargeable battery, a lithium battery, a solar cell, or a power plug connectable with an external power source.

The present invention has the following advantageous features:

1. The light emitted by the first light-emitting elements of the present invention can be changed in color to simulate changes in weather condition.

2. The light emitted by the second light-emitting elements of the present invention can be changed in wavelength to help accelerate the growth of a plant irradiated with such light.

3. The water supply unit of the present invention can be controlled to draw and supply water periodically in order for a plant cultivated with the plant-growing lamp to absorb the water supplied, thereby promoting the growth of the plant.

4. The first light-emitting elements, the second light-emitting elements, and the water supply unit of the present invention can be activated at the same time in conjunction with the loudspeaker generating a thunderous sound effect so as to simulate changes in weather condition and thus bring fun to plant cultivation.

DETAILED DESCRIPTION OF THE INVENTION

Figure 1:
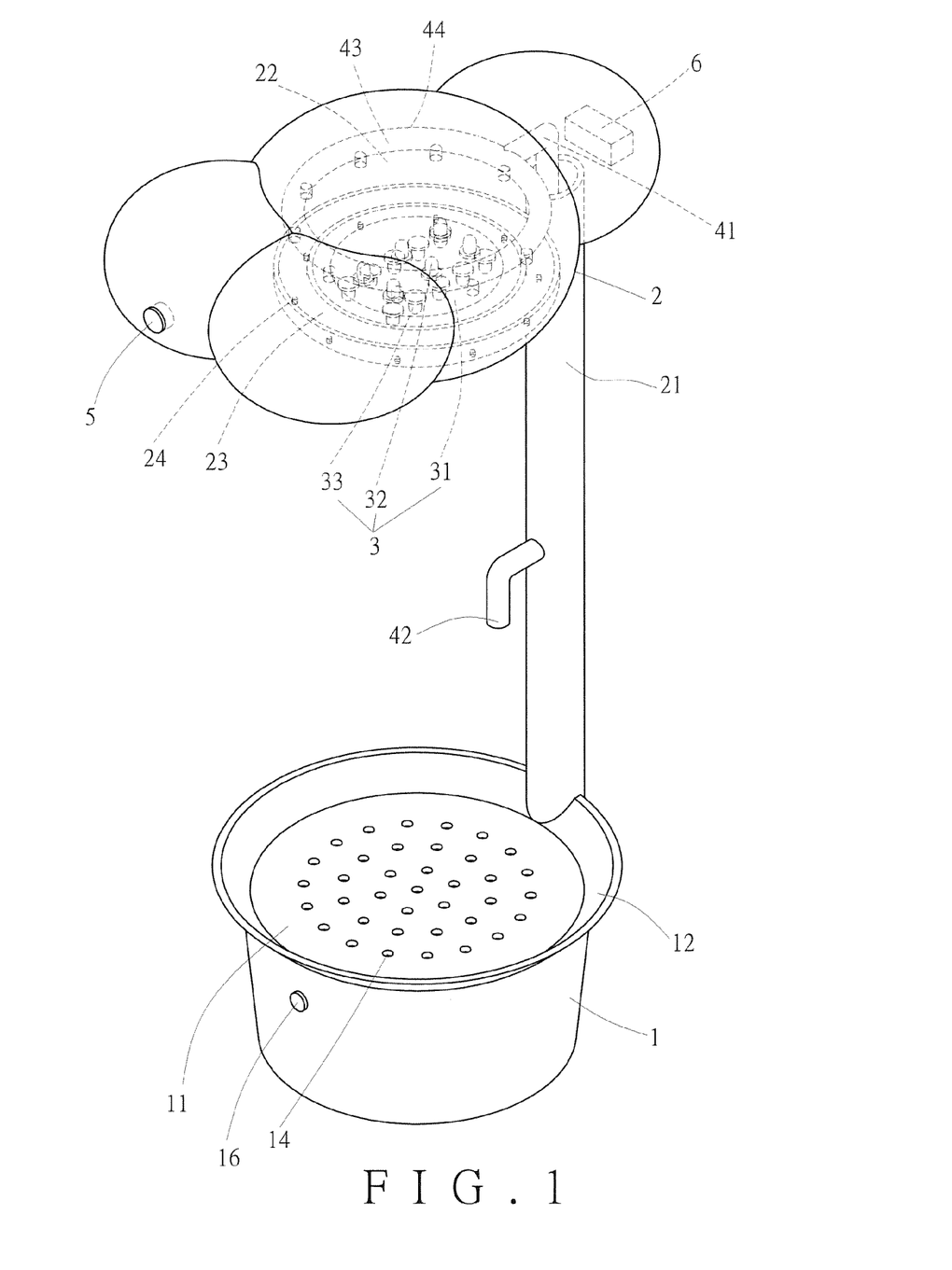
FIG. 1 is a perspective view of an embodiment of the present invention.
Figure 2:
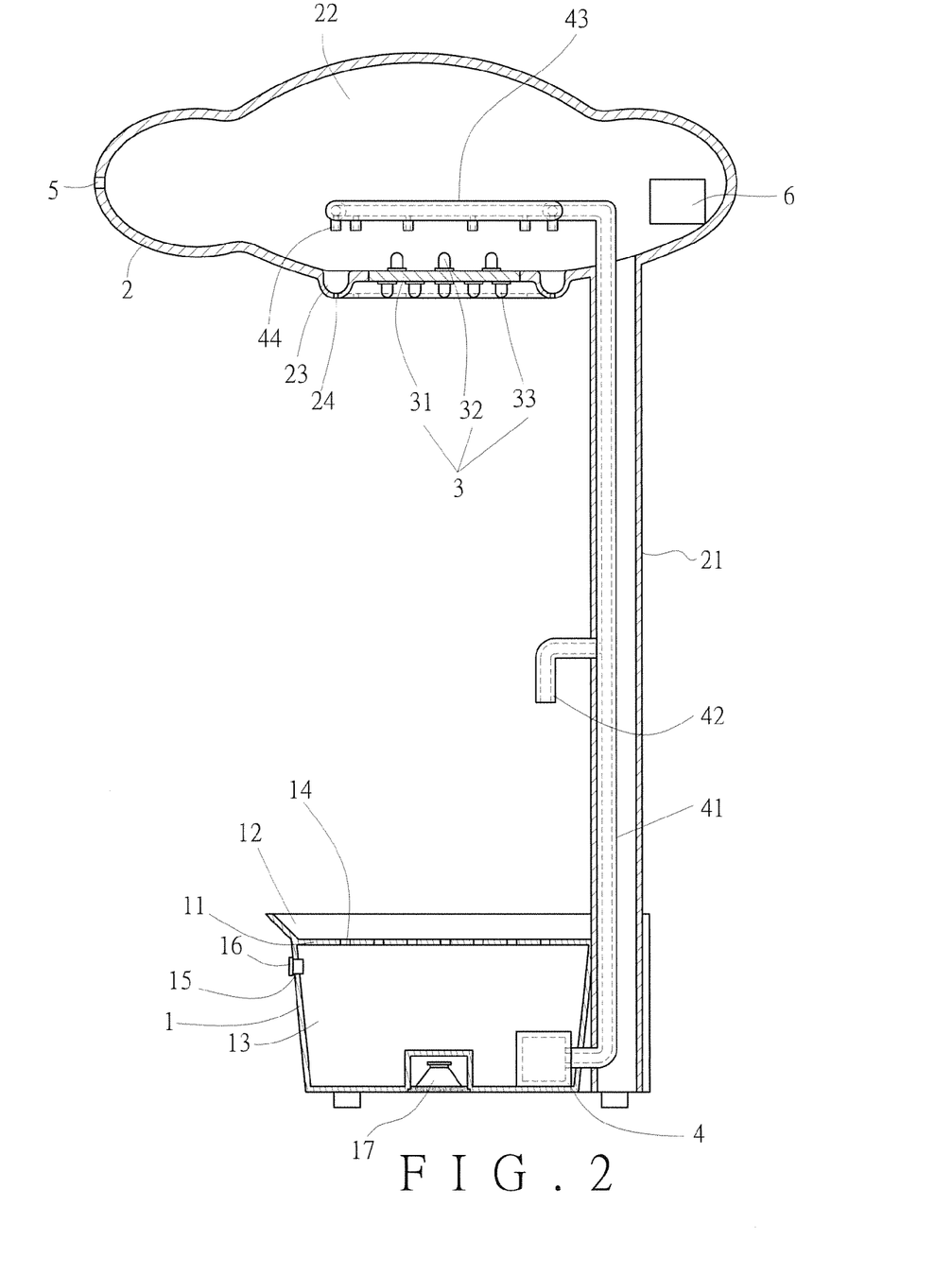
FIG. 2 is a sectional view of and embodiment of the present invention.

Referring to FIG. 1 and FIG. 2, one embodiment of the present invention includes a container 1, a lampshade 2, a lighting unit 3, a water supply unit 4, a sensor 5, and a power supply unit 6.

The container 1 is provided with a partition plate 11 dividing the interior space of the container 1 into a receiving space 12 and a water storage space 13. The partition plate 11 is provided with a plurality of drain holes 14 such that the receiving space 12 is in communication with the water storage space 13. The container 1 is also provided with a water inlet hole 15, which is adjacent to upper periphery of the water storage space 13 and through which water can be injected into the water storage space 13. The water inlet hole 15 is provided therein with a plug 16 for blocking the water inlet hole 15. In addition, a loudspeaker 17 is provided at a bottom portion of the container 1.

The lampshade 2 is provided with a hollow post 21 by which the lampshade 2 is fixed above the container 1. The lampshade 2 is in the shape of a cloud and is made of a light-permeable material. A fixing space 22 is defined in the lampshade 2, and a circular ring-shaped water-collecting channel 23 is provided at a bottom portion of the lampshade 2. The lowest part of the water-collecting channel 23 is provided with a plurality of water-leaking holes 24.

The lighting unit 3 is provided in the lampshade 2 and is provided with a circuit board 31 for controlling purposes. The circuit board 31 is fixed at the center of the water-collecting channel 23 of the lampshade 2. A plurality of first light-emitting elements 32 are provided at a top portion of the circuit board 31 while a plurality of second light-emitting elements 33 are provided at a bottom portion of the circuit board 31. The first light-emitting elements 32 and the second light-emitting elements 33 are light-emitting diodes (LEDs). The circuit board 31 has different circuits for driving the first light-emitting elements 32 to change the color of the light they emit so as to effect a change in local environment, and for driving the second light-emitting elements 33 to change the wavelength of the light they emit so as to provide the light needed by plants of different species or in different stages of growth.

Figure 3:
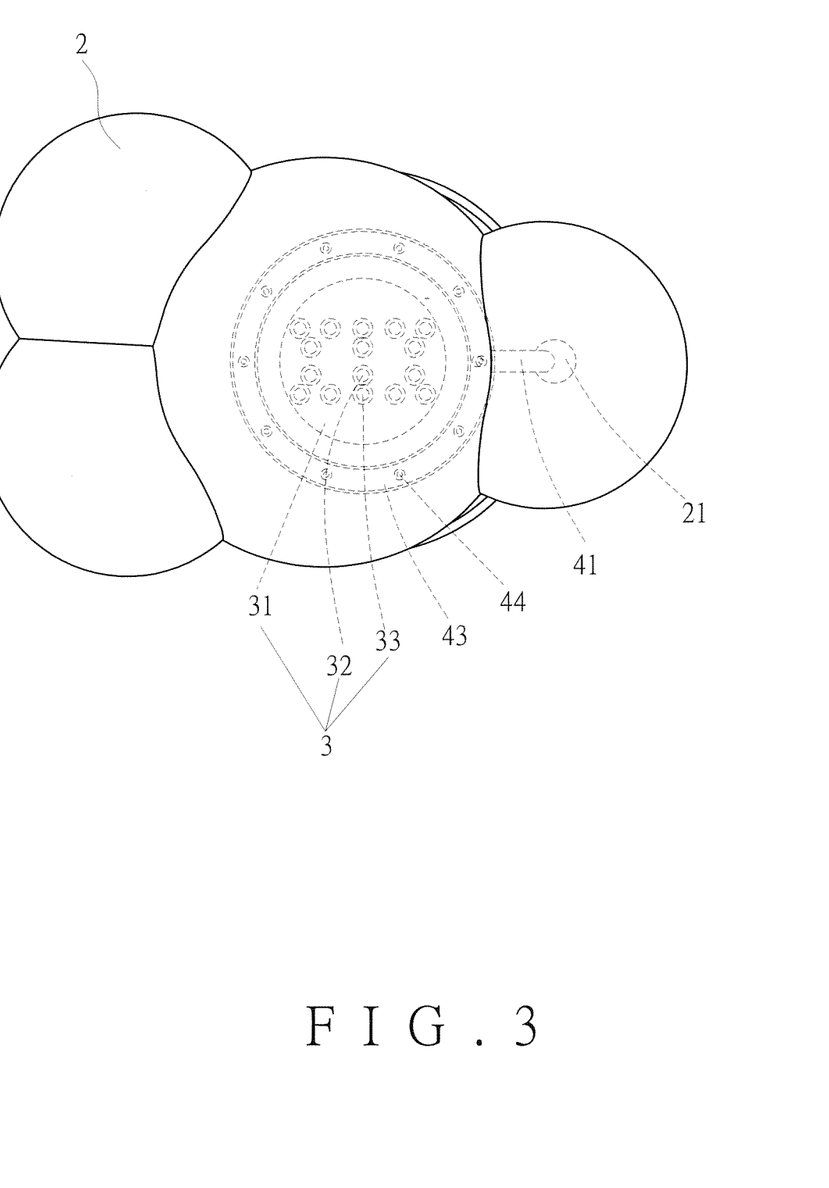
FIG. 3 schematically shows how the water outlet holes in an embodiment of the present invention are spaced from the circuit board.

The water supply unit 4 is provided in the water storage space 13 in the container 1 and can be a water pump. The water supply unit 4 is so designed that it can be triggered to draw water from the water storage space 13. The water supply unit 4 is connected with a pipe 41. The pipe 41 extends through the hollow post 21 and is provided with a first water outlet end 42 and a second water outlet end 43. The first water outlet end 42 lies above the receiving space 12 of the container 1. The second water outlet end 43 is in the fixing space 22 of the lampshade 2 and is provided with a plurality of water outlet holes 44. The water outlet holes 44 are above the water-collecting channel 23 and are spaced apart from the circuit board 31 of the lighting unit 3 (as can be seen more clearly in FIG. 3).

The sensor 5 is provided at an appropriate position on the lampshade 2. Preferably, the position at which the sensor 5 is provided allows the sensor 5 to sense anyone approaching the lampshade 2. The sensor 5 is separately connected to the lighting unit 3, the water supply unit 4, and the loudspeaker 17 in order to transmit signals to and from the lighting unit 3, the water supply unit 4, and the loudspeaker 17. When the sensor 5 senses an approaching person, it triggers the lighting unit 3 to effect a change in local environment, the water supply unit 4 to start drawing water, and the loudspeaker 17 to generate a thunderous sound effect. The sensing technique of the sensor 5 can be an infrared sensing technique, an ultrasound sensing technique, a photoelectric sensing technique, an RFID (radio frequency identification) sensing technique, an electromagnetic wave sensing technique, or a radar sensing technique, among others.

The power supply unit 6 is provided in the fixing space 22 of the lampshade 2. The power supply unit 6 is separately electrically connected to the loudspeaker 17, the lighting unit 3, the water supply unit 4, and the sensor 5 in order to supply the electricity needed by the loudspeaker 17, the lighting unit 3, the water supply unit 4, and the sensor 5 during operation. The power supply unit 6 can be a dry battery, a rechargeable battery, a lithium battery, or a solar cell in order to meet different power demands. The power supply unit 6 can also be a power plug connectable with an external alternating-current (AC) power source, such as the mains, with a view to providing sustained electricity.

Figure 4:
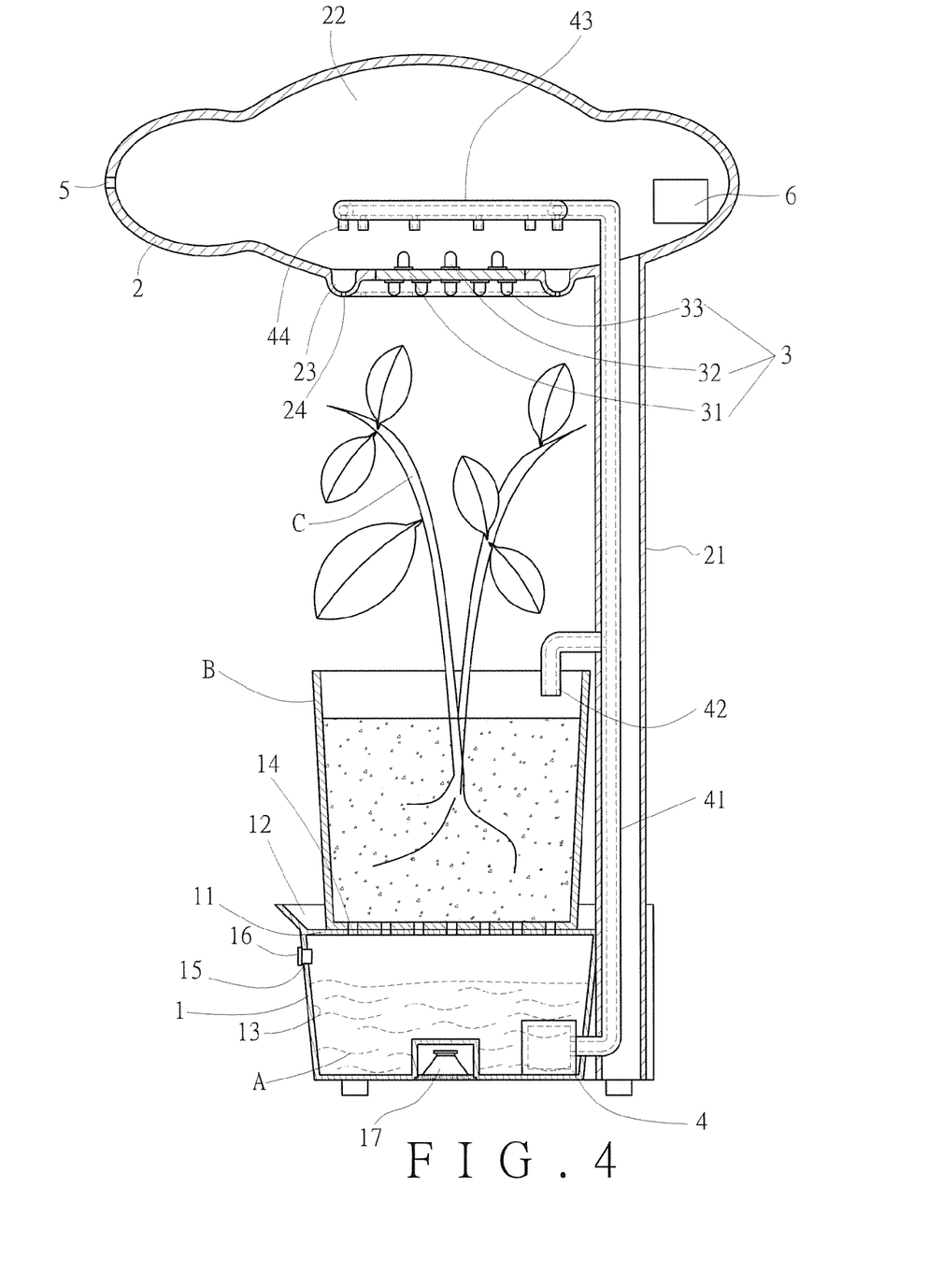
FIG. 4 schematically shows a state of use of an embodiment of the present invention.

In use, referring to FIG. 4, the plug 16 in the water inlet hole 15 of the container 1 is removed, and an appropriate amount of water A is injected through the water inlet hole 15 into the water storage space 13 for storage. Then, the plug 16 is put back in place to reduce evaporation of the water A. A pot B can be placed in the receiving space 12 and planted with a plant C, wherein the pot B together with the plant C can be replaced as desired at any time. After that, the container 1 is put in a proper place indoors so that the entire assembly serves as a decoration or part of a landscape.

The circuit board 31 of the lighting unit 3 can drive the first light-emitting elements 32 at the top portion of the circuit board 31 to emit light of an appropriate color and change the light color as scheduled. Based on the species or growth stage of the plant C, the circuit board 31 can also drive the second light-emitting elements 33 at the bottom portion of the circuit board 31 to change the wavelength of the light they emit, thereby adapting the light to the growth of the plant C. In addition, the circuit board 31 can properly adjust the daily irradiation time of the second light-emitting elements 33 to help accelerate the growth of the plant C.

Figure 5:
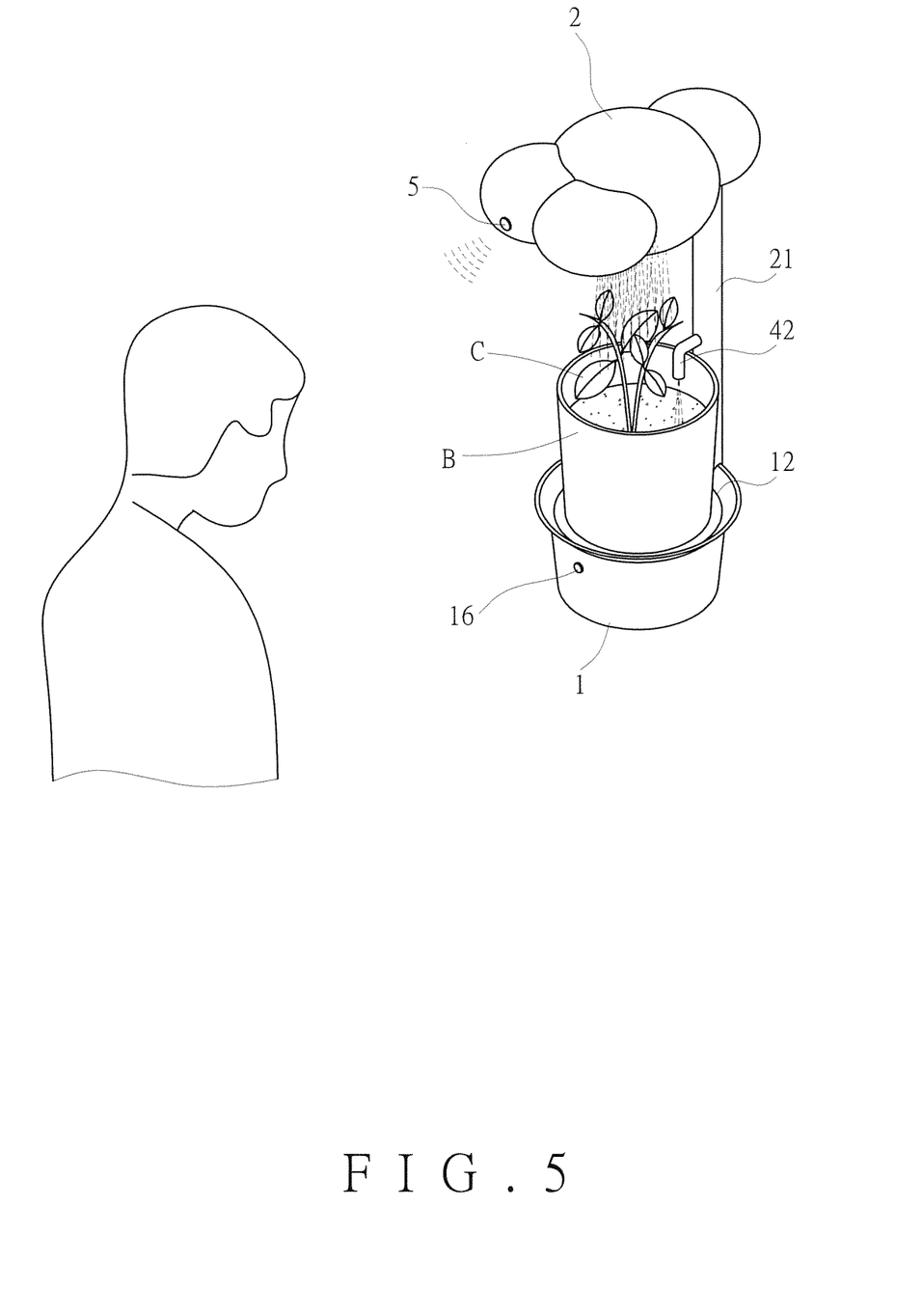
FIG. 5 schematically shows how a change in local environment is triggered by the approach of a person according to an embodiment of the present invention.
Figure 6:
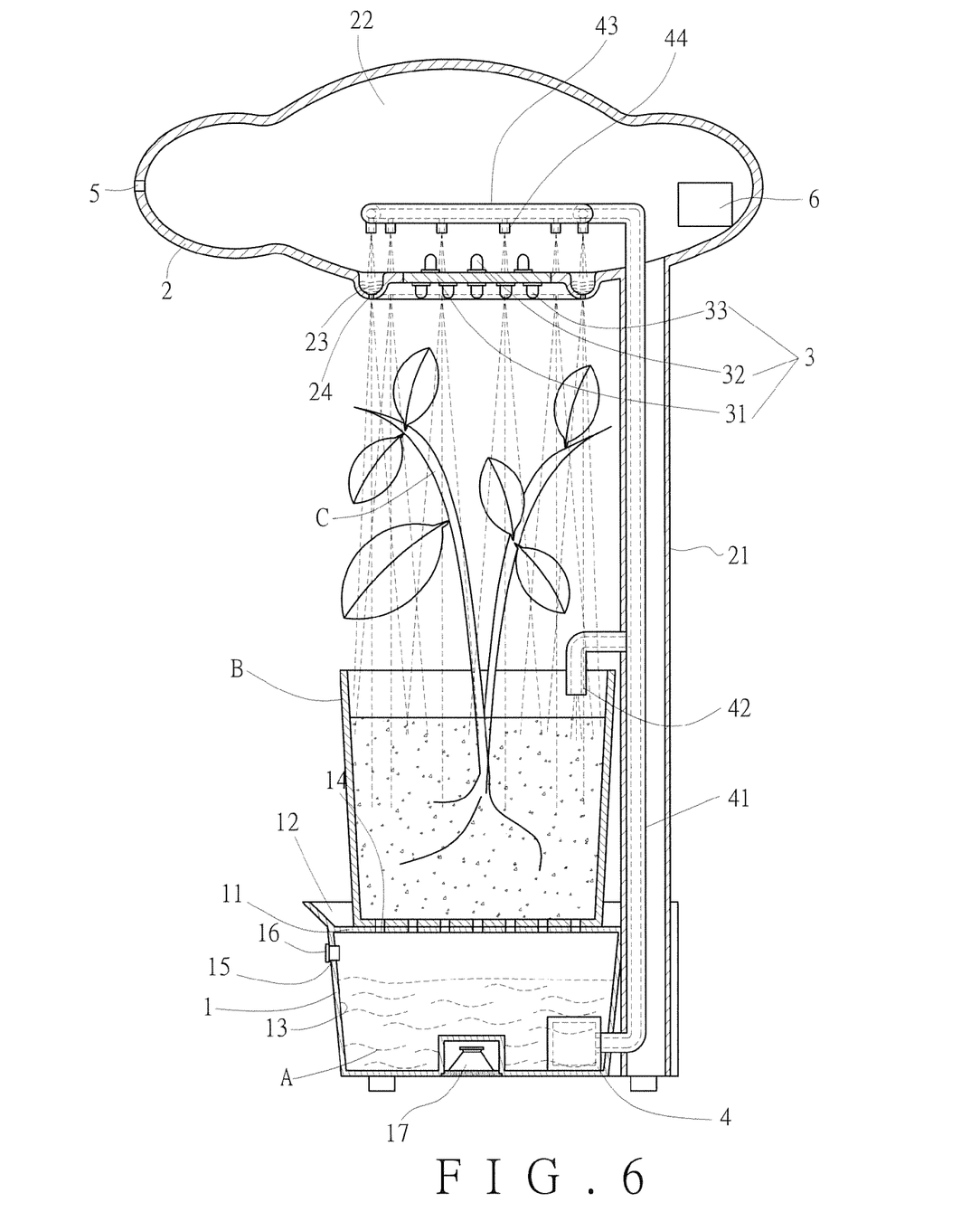
FIG. 6 schematically shows how a plant is watered in a continuous and cyclic manner according to an embodiment of the present invention.

When someone approaches the container 1, referring to FIG. 5 and FIG. 6, the sensor 5 on the lampshade 2 sends a signal to the circuit board 31 of the lighting unit 3 upon sensing the approach of the person, thus triggering the circuit board 31 to effect a change in local environment. In this embodiment, the change in local environment involves a simulated changing weather condition. To start with, the circuit board 31 drives the first light-emitting elements 32 to emit light of changing colors. For example, in order to simulate the color of a looming dark cloud, the light emitted by the first light-emitting elements 32 is turned from white to grey such that the light-permeable cloud-shaped lampshade 2 resembles a white cloud changing into a dark one. The circuit board 31 of the lighting unit 3 can also drive an appropriate number of the first light-emitting elements 32 to emit intermittently flickering white light that mimics lightning. In the meantime, the sensor 5 triggers the loudspeaker 17 to generate a thunderous sound effect accompanying the lightning effect simulated by the first light-emitting elements 32. To enhance the change in local environment, the circuit board 31 can drive the second light-emitting elements 33 to emit light of changing colors simultaneously with the first light-emitting elements 32, instead of light designed to promote the growth of the plant C. For example, the light of the second light-emitting elements 33 can turn dark to mimic the change in daylight that occurs on a cloudy or rainy day. Following that, the sensor 5 turns on the water supply unit 4 and drives it to draw the water A in the water storage space 13 and to deliver the water A through the pipe 41 to the first water outlet end 42, where the water A flows out. The water A is also delivered to and sprayed out of the water outlet holes 44 at the second water outlet end 43 of the pipe 41, flows through the plural water-leaking holes 24 in the water-collecting channel 33, and falls on the plant C in the pot B in the receiving space 12 of the container 1 to simulate rain. The water A fallen into the pot B can be absorbed by the root of the plant C to promote the growth of the plant C. The excessive water A in the pot B, on the other hand, can flow out of the pot B and pass from the receiving space 12 through the drain holes 14 in the partition plate 11 to the water storage space 13 in order to be stored again and be drawn by the water supply unit 4 in acyclic manner. Once the simulated weather condition, i.e., the change in local environment, lasts a certain amount of time, the circuit board 31 of the lighting unit 3 drives the first light-emitting elements 32 to stop changing light colors and continue to emit white light. The circuit board 31 also drives the loudspeaker 17 to stop generating the thunderous sound effect and the water supply unit 4 to stop drawing and supplying water, thus concluding the change in local environment. When the sensor 5 is approached once more and senses the approaching person, the foregoing change in local environment will be repeated. The variety of the change in local environment hopefully adds fun to the cultivation of the plant C.

In the embodiment described above, the change in local environment involves variation in light color of the first light-emitting elements 32 and the second light-emitting elements 33, the thunderous sound effect of the loudspeaker 17, and the water drawing and supplying actions of the water supply unit 4. In another embodiment, it is feasible that only the first light-emitting elements 32 change light colors to simulate a change in weather condition, or only the second light-emitting elements 33 change light colors to accelerate the growth of the plant C, or only the loudspeaker 17 generates a thunderous sound effect, or only the water supply unit 4 draws and supplies water periodically to sustain the growth of the plant C.

The embodiments provided herein are only a few practicable embodiments of the present invention and should not be construed as restrictive of the scope of the patent protection sought by the applicant. All simple equivalent changes and substitutions made according to the appended claims and specification of the present invention should fall within the scope of the claims of the present invention.

What is claimed is:

1. A plant-growing lamp capable of effecting a change in local environment, the plant-growing lamp comprising:
   a container provided with a partition plate for dividing an interior space of the container into a receiving space and a water storage space, the partition plate being provided with a plurality of drain holes such that the receiving space is in communication with the water storage space, the container having a bottom portion provided with a loudspeaker;
   a lampshade provided above the container, wherein the lampshade is provided with a post fixed to the container, is light-permeable, and is provided with a fixing space;
   a lighting unit provided in the fixing space and provided with a circuit board, wherein the circuit board has a top portion provided with a plurality of first light-emitting elements, has a bottom portion provided with a plurality of second light-emitting elements, and is configured for driving the first light-emitting elements to emit light of different colors and driving the second light-emitting elements to emit light of different wavelengths;
   a water supply unit provided in the water storage space and connected with a pipe, wherein the pipe is provided with at least one water outlet end above the receiving space;
   a sensor provided at the lampshade and separately connected to the loudspeaker, the lighting unit, and the water supply unit in order to transmit signals to and from the loudspeaker, the lighting unit, and the water supply unit, wherein upon sensing an approaching person, the sensor triggers the loudspeaker to generate a thunderous sound effect, the lighting unit to change the light of the first light-emitting elements and/or the second light-emitting elements, and the water supply unit to draw water; and
   a power supply unit provided in the fixing space and separately electrically connected to the lighting unit, the water supply unit, the loudspeaker, and the sensor.

2. The plant-growing lamp of claim 1, wherein the container is provided with a water inlet hole adjacent to upper periphery of the water storage space, and the water inlet hole is provided therein with a plug.

3. The plant-growing lamp of claim 1, wherein the lampshade is shaped as a cloud.

4. The plant-growing lamp of claim 1, wherein both the first light-emitting elements and the second light-emitting elements are light-emitting diodes (LEDs).

5. The plant-growing lamp of claim 1, wherein the water supply unit is a water pump.

6. The plant-growing lamp of claim 1, wherein the at least one water outlet end includes a first water outlet end and a second water outlet end, and the first water outlet end is above the receiving space of the container.

7. The plant-growing lamp of claim 6, wherein the lampshade has a bottom portion provided with a circular ring-shaped water-collecting channel, the water-collecting channel has a lowest part provided with a plurality of water-leaking holes, the circuit board is fixed at a center of the water-collecting channel, and the second water outlet end is provided with a plurality of water outlet holes above the water-collecting channel.

8. The plant-growing lamp of claim 7, wherein the water outlet holes are spaced from the circuit board.

9. The plant-growing lamp of claim 1, wherein the sensor conducts sensing by an infrared sensing technique, an ultrasound sensing technique, a photoelectric sensing technique, an RFID (radio frequency identification) sensing technique, an electromagnetic wave sensing technique, or a radar sensing technique.

10. The plant-growing lamp of claim 1, wherein the power supply unit is a dry battery, a rechargeable battery, a lithium battery, a solar cell, or a power plug connectable with an external power source.

* * * * *